March 12, 1940.  C. SCHWARZ ET AL  2,193,568
CUTTING AND CREASING MACHINE
Filed July 4, 1939  9 Sheets-Sheet 1

INVENTORS
CARL SCHWARZ
OTTO BAUER
BY
W. W. Williamson
ATTORNEY

March 12, 1940.                  C. SCHWARZ ET AL                  2,193,568
                              CUTTING AND CREASING MACHINE
                              Filed July 4, 1939          9 Sheets-Sheet 2

Fig. 2.

INVENTORS
CARL SCHWARZ
OTTO BAUER
BY W. B. Williamson
ATTORNEYS

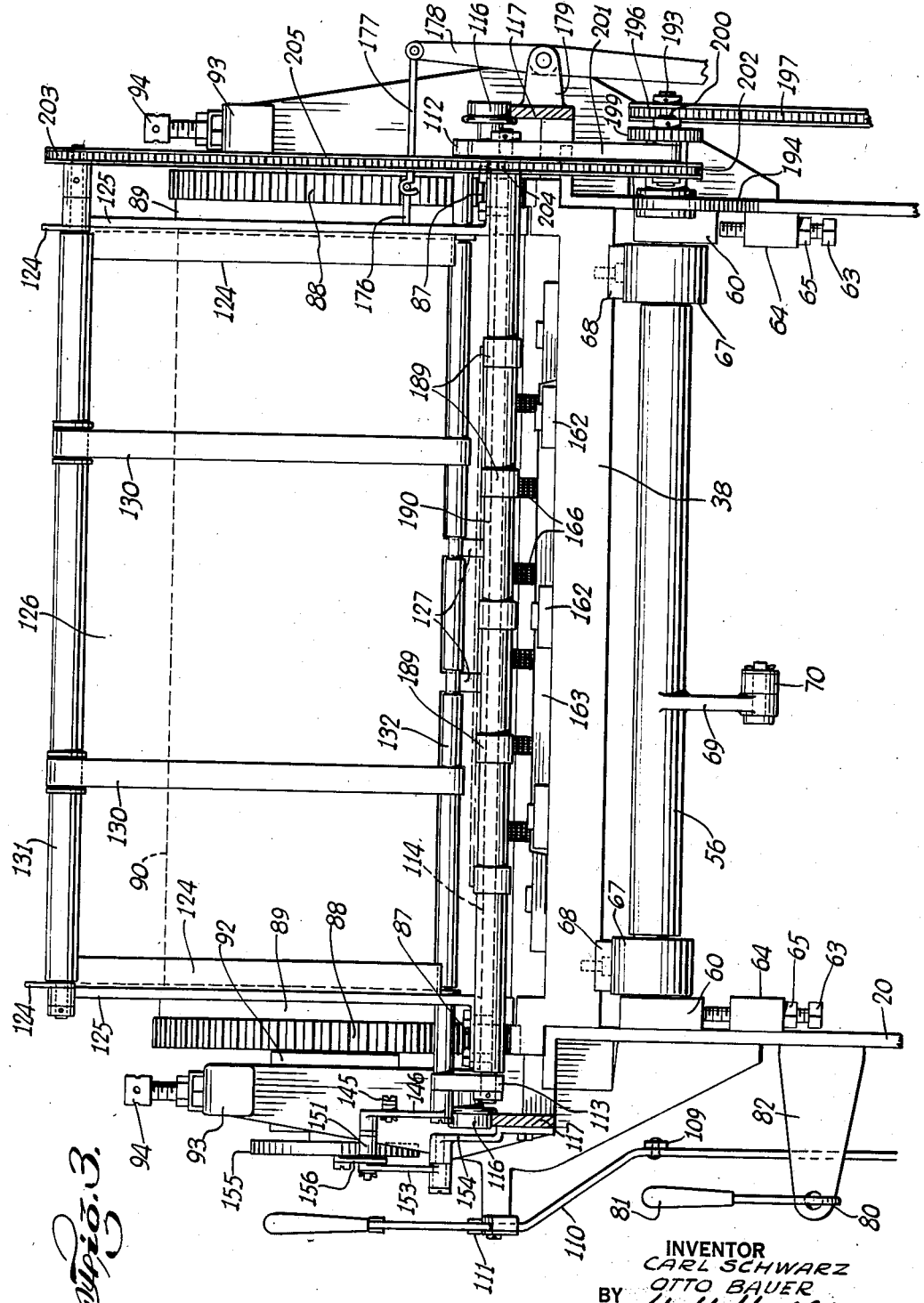

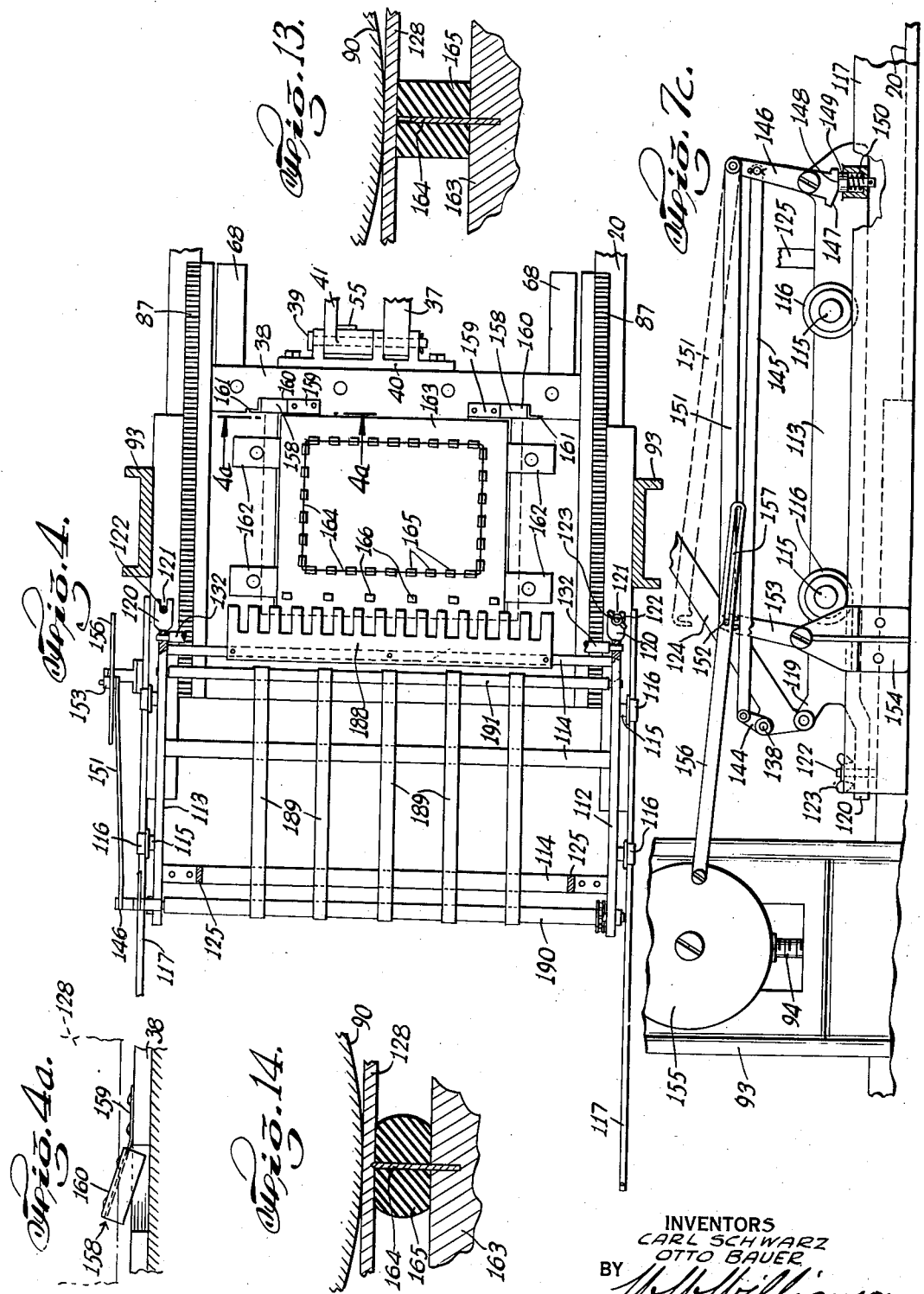

March 12, 1940.　　　C. SCHWARZ ET AL　　　2,193,568
CUTTING AND CREASING MACHINE
Filed July 4, 1939　　　9 Sheets-Sheet 5
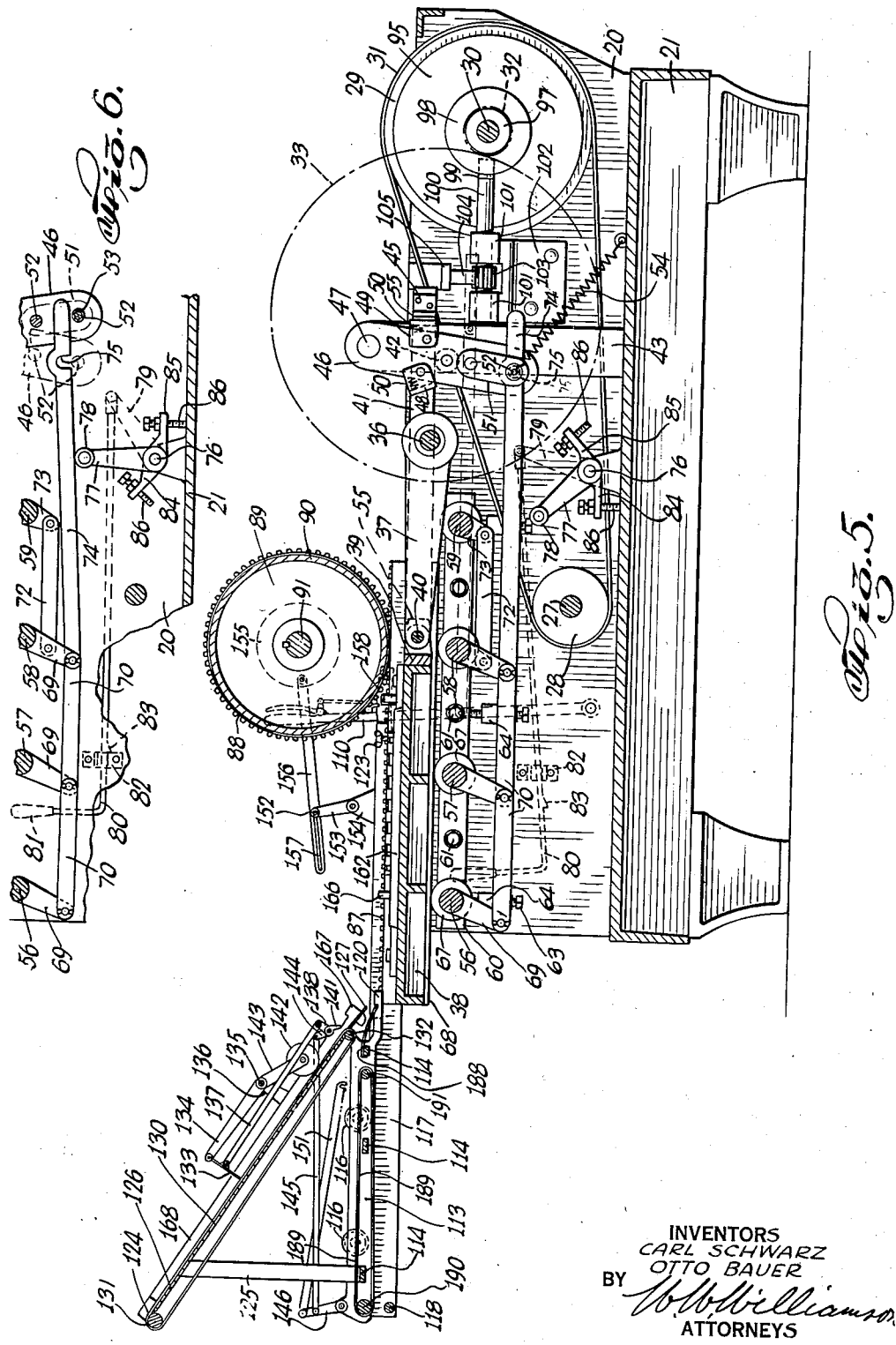
INVENTORS
CARL SCHWARZ
OTTO BAUER
BY
ATTORNEYS

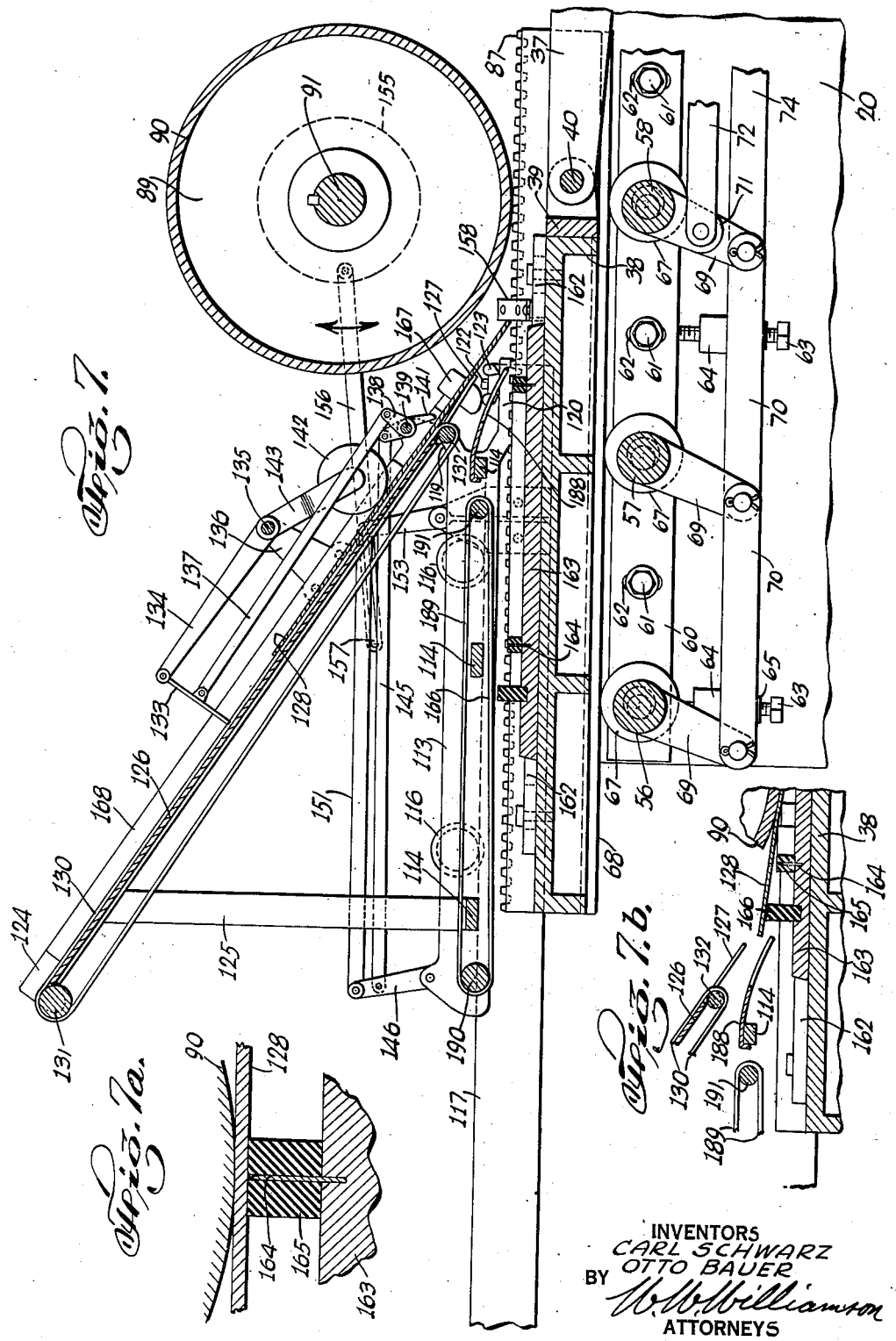

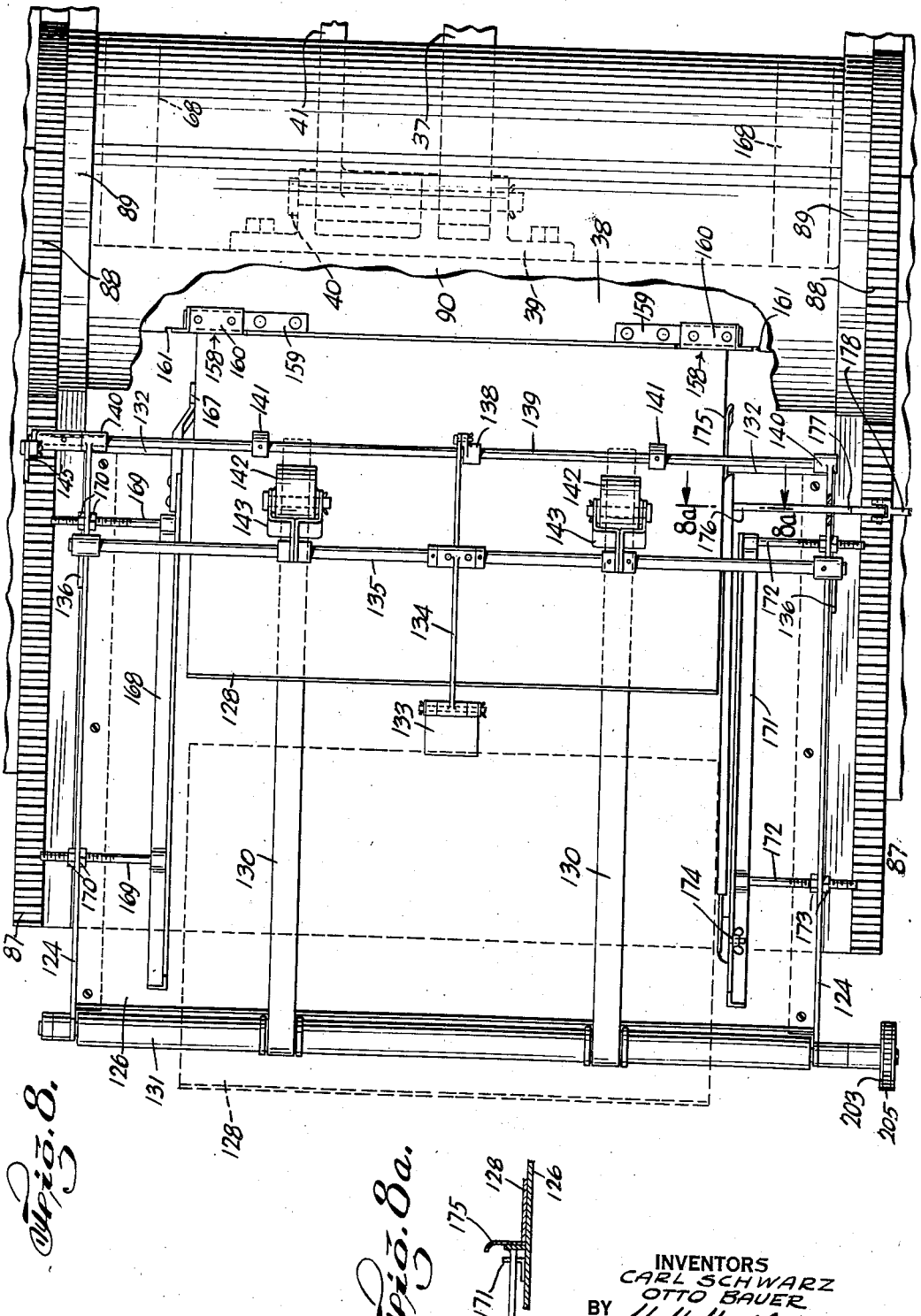

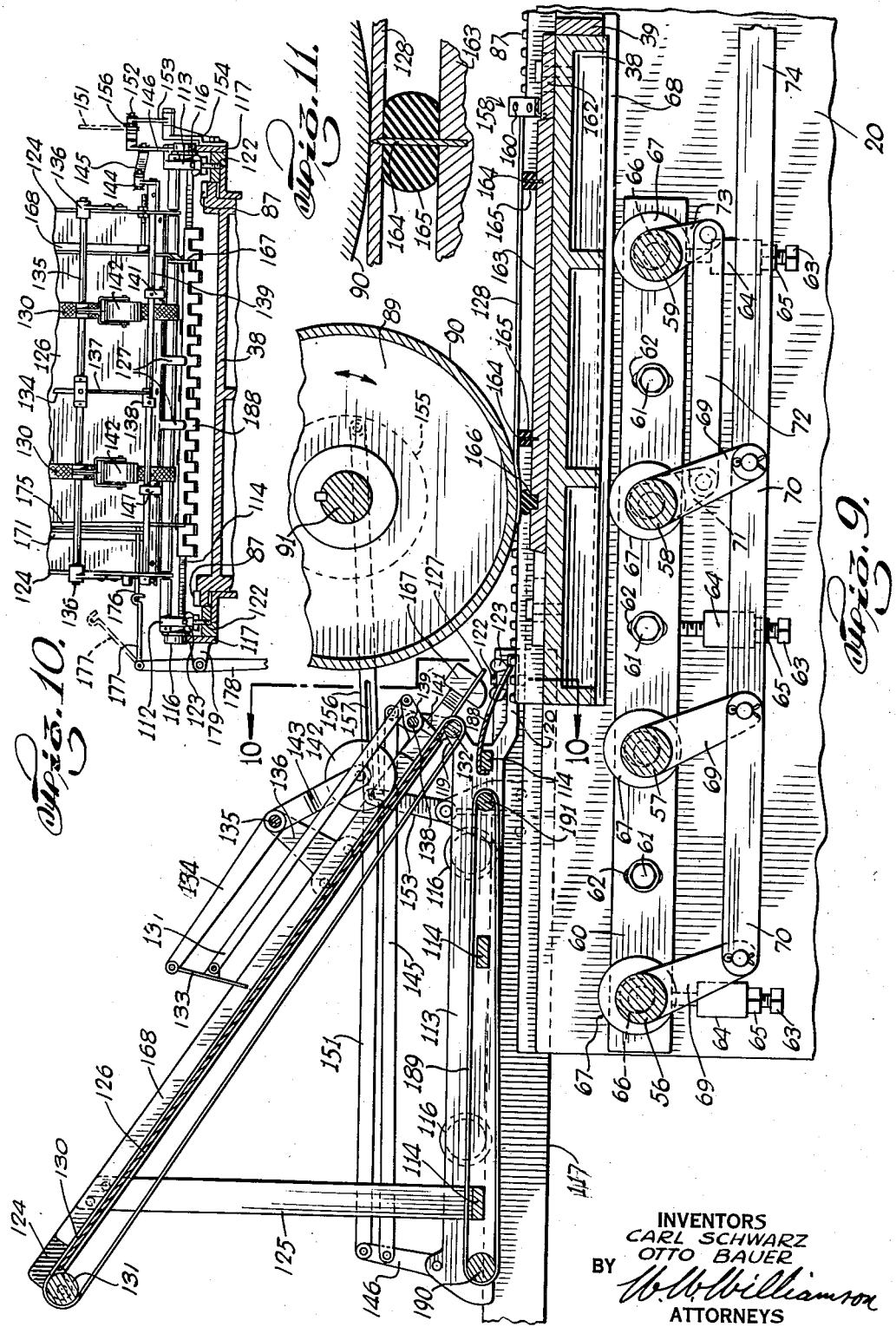

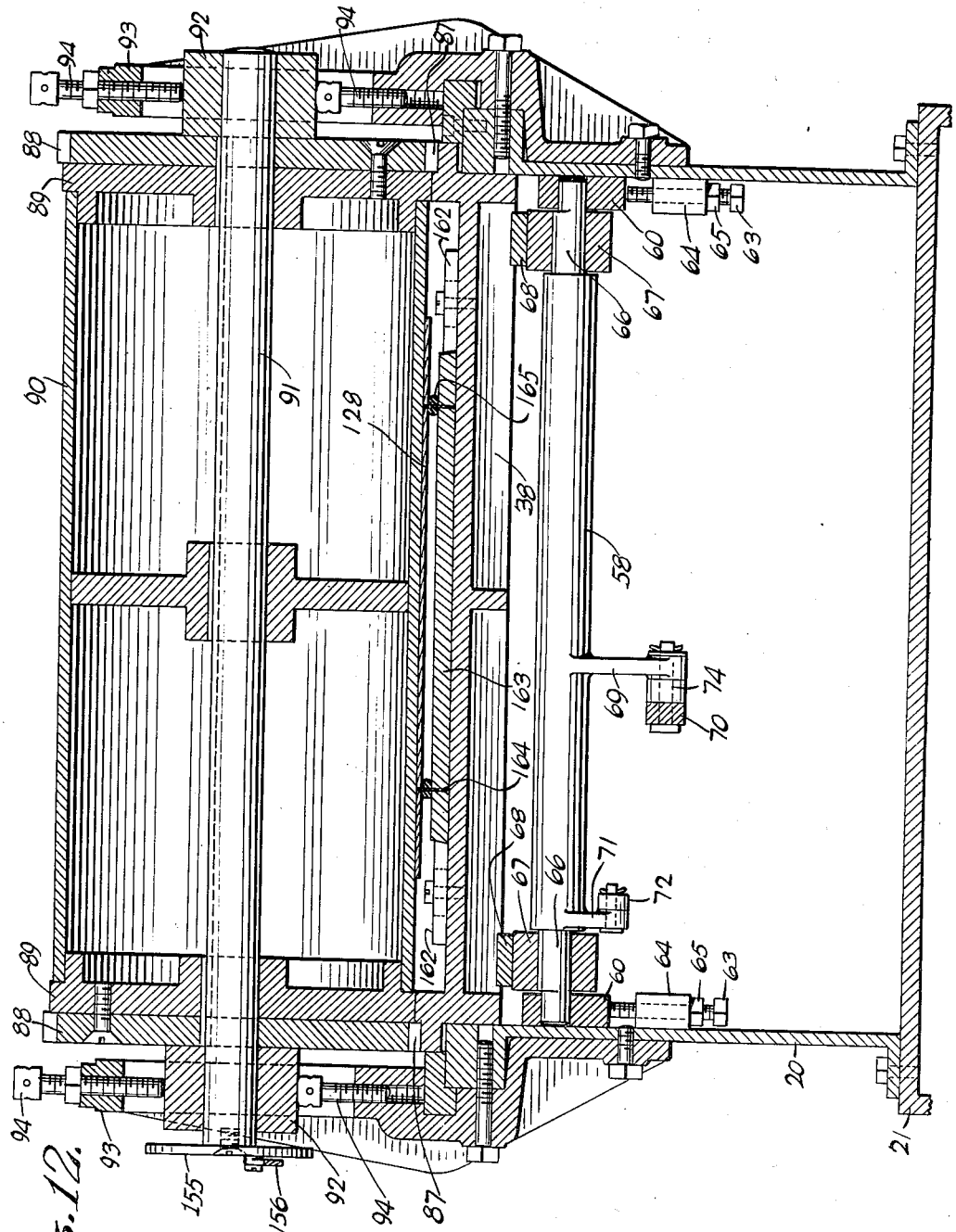

Patented Mar. 12, 1940

2,193,568

UNITED STATES PATENT OFFICE 2,193,568

CUTTING AND CREASING MACHINE

Carl Schwarz and Otto Bauer, New York, N. Y.

Application July 4, 1939, Serial No. 282,790

13 Claims. (Cl. 164—19)

This invention relates to a new and useful cutting and creasing machine and primarily is employed for cutting and/or creasing sheets of cardboard, strawboard, heavy paper or similar materials.

One object of the invention is to provide a machine for cutting and/or creasing a flat sheet of material wherein a continuous progressive pressure is applied to the sheet only during the cutting and/or creasing operations.

Another object of the invention is to produce a machine having a rotary circular pressure member and a flat table member or chase for supporting the cutting or creasing knives constituting the die, one of said members being movable in a straight line relative to the other member.

Another object of the invention is to provide means for automatically feeding material sheets in proper alignment to the die.

Another object of the invention is to employ means accurately registering the material sheets over the die prior to the cutting or creasing operations.

Another object of the invention is to provide means for transmitting motion to the pressure member from the table member, chase or carrier.

Another object of this invention is to provide a wheeled feed and discharge mechanism that is actuated by the main operating mechanism and having means to releasably connect one of the said mechanisms with the other.

Another object of the invention is to provide a unique arrangement of parts for operating the feed and discharge belts which parts are separable without dislocating the elements of the main operating mechanism and those of the feed and discharge mechanism.

Another object of the present invention is to provide means for feeding sheets or cards to the die and discharging them from said die at approximately the same location.

Another object of the invention is to provide an intermittent movement mechanism for controlling the release of the sheets or cards at proper intervals during the feeding operations.

Another object of this invention is to provide for temporarily discontinuing the operations of the table member or chase during a time when other parts are functioning.

A further object of the invention is to provide mechanism to cause the chase to ascend or advance towards the pressure member just prior to the starting of the cutting and/or creasing operations and permit said chase to descend or recede from said pressure member upon completion of the cutting and/or creasing operations.

A still further object of this invention is to provide novel means for removing the cut and/or creased sheet of material from the die.

With the above and other objects in view, this invention consists of the details of construction and combination of elements hereinafter set forth and then designated by the claims.

In order that those skilled in the art to which this invention appertains may understand how to make and use the same, we will describe its construction in detail, referring by numerals to the accompanying drawings forming a part hereof, in which:

Fig. 2 is a top plan view on the line 2—2 of Fig. 1.

Fig. 3 is an enlarged rear end view on the line 3—3 of Fig. 1.

Fig. 4 is a fragmentary sectional plan view on the line 4—4 of Fig. 1.

Fig. 4a is an enlarged detail section on the line 4a—4a of Fig. 4.

Fig. 5 is a sectional view on the line 5—5 of Fig. 2.

Fig. 6 is a view of a portion of Fig. 5 showing the pitman disengaged from the rocker.

Fig. 7 is an enlarged fragmentary longitudinal vertical sectional view of the rear portion of the machine showing the carrier and component parts lowered.

Fig. 7a is an enlarged sectional view of one of the cutting knives and strippers prior to the sheet or card being pressed upon the same.

Fig. 7b is an enlarged detail sectional view of the feed and take-off.

Fig. 7c is a detail elevation of the feed operating mechanism reverse to the illustration in Fig. 7.

Fig. 8 is a plan view of the feed mechanism showing one sheet about to enter on the die and the position of a succeeding sheet illustrated in dotted lines.

Fig. 8a is a detail sectional view on the line 8a—8a of Fig. 8.

Fig. 9 is a longitudinal vertical sectional view similar to Fig. 7 but showing the carrier and component parts elevated.

Fig. 10 is a section on the line 10—10 of Fig. 9.

Fig. 11 is a view of the cutting knife and stripper during the cutting operation.

Fig. 12 is a transverse sectional view of the machine through the pressure member.

Fig. 13 is a sectional view of a creasing knife and its stripper, the latter being fully expanded.

Fig. 14 is a similar view showing the position of creasing knife and a stripper during operation.

Fig. 15 is a detail sectional view on the line 15—15 of Fig. 1.

Figure 1:
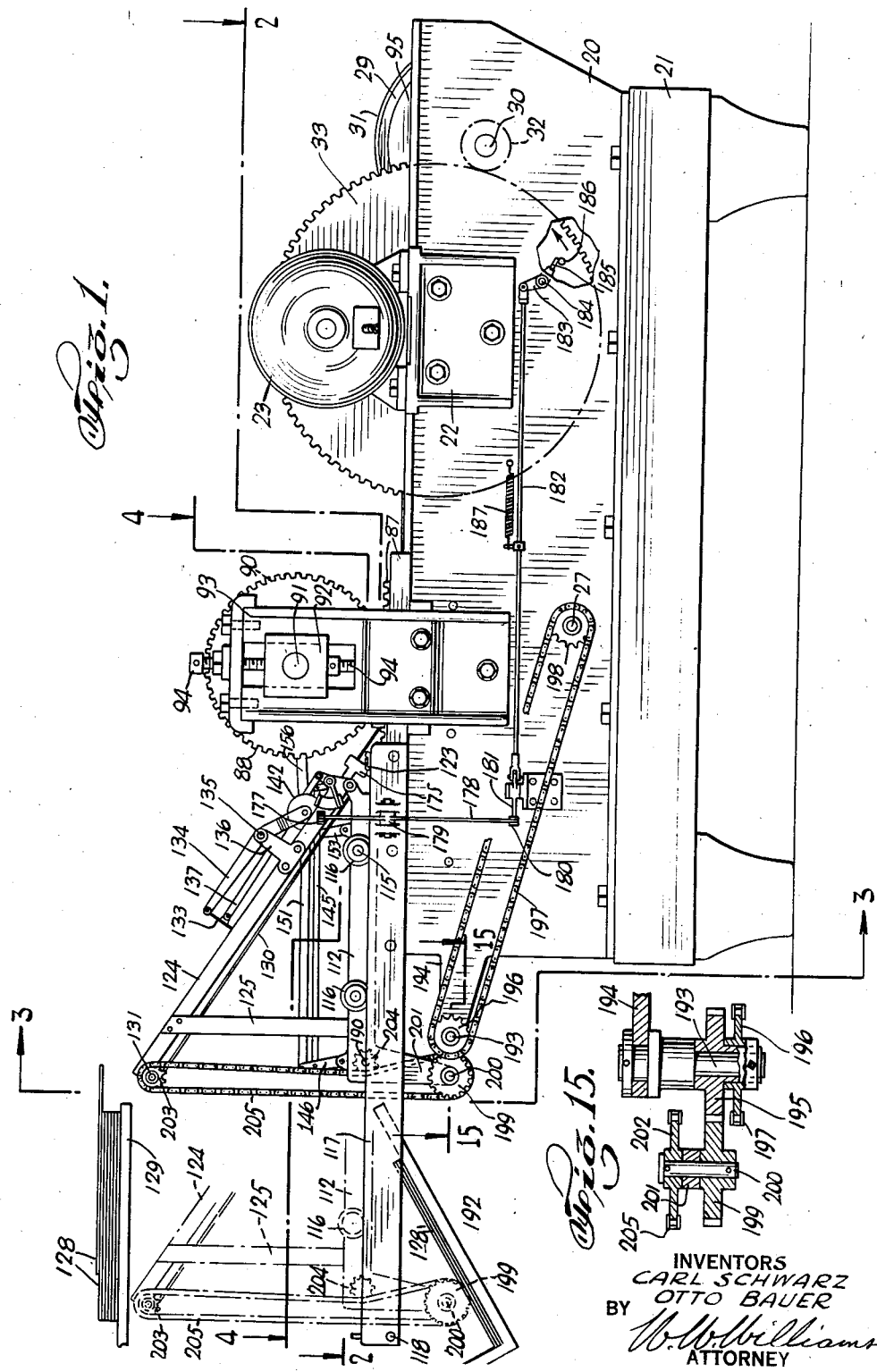
Fig. 1 is a side elevation of the machine.

In carrying out our invention as herein embodied 20 represents a suitable frame mounted on a base 21 and said frame 20 carries a bracket 22 supporting a motor 23. The motor is illustrative of one form of power that may be used for operating the machine. This motor drives a pulley 24, shown as mounted on the motor shaft, over which runs a belt 25 which also runs over the pulley 26 on the countershaft 27. Said shaft 27 has a second pulley 28 fixed thereon in line with the pulley 29 on the shaft 30 which, for convenience of description, will be called the power shaft. A belt 31 runs over the pulleys 28 and 29 for transmitting motion to the power shaft.

On the power shaft 30 is fixed a pinion 32 meshing with a gear 33 suitably journalled on a trunnion or stub shaft 34 mounted in a large boss 35 carried by the frame. The gear 33 is provided with a crank pin 36 on which is journalled one end of a pitman rod 37 and the opposite end is connected to the chase, table, member or carrier 38 by a pin 39 passing through arms of a bracket 40 mounted on said chase, table, member or carrier whereby the chase, table member or carrier is moved to and fro.

One end of a striker rod 41 is also connected to the carrier 38 by the pin 39 so as to reciprocate therewith and the other or outer end of said striker rod rests on a roller 42, Fig. 5, mounted on a suitable axle carried by the upright or standard 43. On the striker rod 41 in spaced relation are two strikers 44 and 45 which alternately strike opposite sides of the pendulous arm 46 pivoted at its upper end to the upright or standard 43 as at 47. In order to protect the edges of the pendulous arm 46 and provide flat, adjustable surfaces which will remain parallel with the faces of the strikers 44 and 45 when engaged by the latter, striker shoes 48 and 49 are mounted on the arm 46. These striker shoes each comprise a U-shaped metal section embracing the arm 46 and pivoted at one corner to said arm and urged into a normally angular position relative to the edges of said arm by a spring 50 between the shoe web and arm edge. As a striker engages its respective shoe the latter adjusts itself to the contact surface of the striker and retains the parallel relation between the two regardless of the position assumed by the pendulous arm 46.

Whenever a striker contacts the arm 46 the latter is shifted from one position to another as will be apparent by reference to Fig. 6.

On the lower free end of the pendulous arm 46 is a plate 51 in spaced relation to a face of said arm and held in place by stay pins 52, the lower one of which may have a roller 53 journalled thereon as an antifriction device.

A tension device 54, such as a spring, urges the pendulous arm 46 rearwardly and in order to deaden the sound incident to the strikers 44 and 45 hitting said arm or more particularly the shoes 48 and 49 pads 55 of leather or other suitable material are mounted on the strikers as shown or on the shoes as an obvious equivalent.

A number of eccentric shafts 56, 57, 58 and 59, see Figs. 3, 5, 7, 9 and 12 are journalled in adjustable side rails 60 extending longitudinally of the machine frame and to the sides of which they are fastened by bolts 61 projecting through vertical slots 62. Said side rails are retained in their adjusted positions by the adjusting screws 63 threaded through bosses 64 on the machine frame and engaging the underneath edges of the side rails and said adjusting screws are held set by the lock nuts 65.

Each eccentric shaft, to constitute such, has eccentric portions 66 adjacent both ends and on said eccentric portions are mounted rollers which therefore form cams 67 which support the table member or carrier 38 through beams 68 on the underside of said carrier. In one position of the cams the table member or carrier 38 is lowered, as shown in Figs. 5 and 7, whereas in another position of said cams the table member or carrier is raised or elevated, as illustrated in Fig. 9.

Eccentric shafts 56, 57 and 58 have depending arms 69, adjacent ones of which are connected by links 70 and shaft 58 is provided with an additional arm 71, preferably shorter than the first mentioned arms, and said arm 71 is connected by a link 72 with the similar arm 73 on the shaft 59. This arrangement connects all of the eccentric shafts and the movements of one will be transmitted to all of the others.

In order to actuate the carrier elevating mechanism, including the eccentric shafts and their associated wheel cams, one end of a connecting rod 74 is pivotally attached to one of the depending arms 69, preferably the arm carried by shaft 58, and the other end of said connecting rod extends to the pendulous arm 46 for detachable connection thereto. As illustrated, said connecting rod projects into the space between the pendulous arm proper and the plate 51 thereon and is long enough to prevent displacement of said connecting rod from the space or its relation to the pendulous arm. The connecting rod 74 has a notch 75, Fig. 6, in its lower edge for registration with the bottom stay pin 52 to temporarily attach said connecting rod to the pendulous arm 46 whereby any movements of said arm 46 will be transmitted to the elevating mechanism of the carrier 38.

The connecting rod 74 can only be detached from the pendulous arm 46, or the bottom stay pin, manually and a convenient way to accomplish this is to journal a shaft 76 transversely of the machine frame with a lifting arm 77 on the inner end thereof and underlying the connecting rod 74 so the free end of arm 77 may be moved or swung into engagement with the underside or edge of said connecting rod. Said arm 77 may have a roller 78 thereon as an anti-friction element. On the outer end of the shaft 76 is another arm 79 to which is attached an operating rod 80 having a handle 81. This operating rod passes through a guide 82 in which it can both slide longitudinally and oscillate vertically and said operating rod is provided with a ratchet tooth 83 which will readily pass through guide 82 when the rod 80 is moved towards the right as shown in Figs. 5 and 6. Said ratchet tooth after passing through the guide will engage behind the latter, as in Fig. 6, and prevent accidental retrograde movement of the operating rod and associated parts although by lifting the handle end of said operating rod the ratchet tooth may be disengaged from the guide and the parts retracted.

In order to limit the movements of the lifting arm 77 two feet 84 and 85 projecting in generally opposite directions but at suitable angles to each other, are associated with the arm 77, either formed as a part of its hub or fixed to the shaft 76. Adjustable stops 86 are carried by the feet 84 and 85 and are herein illustrated as screws passing through the feet and having threaded connection therewith. These stops coact with a wall of the machine frame, for example, the top of the base 21 to regulate the throw of the lifting arm 77.

The carrier 38 has a rack 87 at each side and the teeth thereof mesh with the gears 88 fixed to the heads 89 of the cylinder 90 which is the pressure member. The rack and gear teeth are long enough to remain in mesh even when the carrier is lowered.

The pressure cylinder or member 90 is fixed to a shaft 91 having its ends journalled in sliding blocks 92 mounted in stanchions 93 on opposite sides of the machine frame and adjustable vertically through the medium of the screws 94.

From the above description it will be apparent that as the gear wheel 33 is revolved the carrier 38 will be reciprocated causing the racks 87 to transmit a rotary motion, first in one direction and then in the other, to the cylinder 90 through the gears 88. In order to couple the pulley 29 to the shaft 30 on which said pulley is loosely mounted, a clutch 95 is non-rotatably and slidably located on said shaft and cooperates with the pulley 29 as a companion clutch member. The clutch 95 is normally urged towards and in engagement with the pulley 29 by a spring 96 coacting with the clutch, as the movable element, and with a collar 97, as the stationary element, said collar being fixed to the shaft.

To disconnect the shaft 30 from the pulley 29 the clutch 95 is to be withdrawn and for this purpose said clutch is provided with a flange 98 against the inside of which coacts a cam 99 on a cam shaft 100 journalled in spaced bearings 101 on the bifurcated end of a bracket 102 secured to the machine frame. On the cam shaft 100 is a gear 103 with which meshes a longitudinally movable rack 104 having an extension or holder 105 which passes through the machine frame and has a pin or finger at its outer end projecting into a cam slot 106 in a slide 107 mounted in a guide bracket 108 on the machine frame. To and fro movement of the slide 107 will move the rack 104 in and out and impart rotary movements to the cam shaft 100 through the gear 103 and thereby withdraw the clutch from the pulley 29 or release the clutch so that it may be moved into engagement with said pulley 29.

To actuate the slide 107 one end of a rod 109 is pivoted to said slide and the other end to an operating lever 110 provided with a hand operated ratchet 111 for holding said operating lever 110 in either its forward or retracted positions.

The feed and discharge mechanism is, in effect, a wheeled carriage so that it may be positioned close to the pressure member or cylinder 90 as shown in elevation in Fig. 1 or retracted as indicated by the dotted lines in the same figure. Two horizontal side pieces 112 and 113 are held in proper spaced relation by transverse tie bars 114 and on said side pieces are mounted trunnions or stub axles 115 on which are journalled flange wheels 116 running on rails 117 projecting from the machine frame and the outer ends of said rails are braced by a tie bar 118, Fig. 2.

The inner ends of the side pieces 112 and 113 are formed to provide horns 119 and 120 in a vertical plane one above the other, Fig. 7c, and the horn 120 is bifurcated to produce an open ended slot 121, Fig. 4, for registration with a stud bolt 122, or equivalent, on which a nut 123 is threaded to clamp the horn 120 and hold the wheeled carriage in proper operative relation to the pressure cylinder 90 and the carrier 38 when the latter is in its initial position.

To the other horn 119 of both of the horizontal side pieces 112 and 113 are attached the inclined side rafters 124 the upper portions of which are supported by struts 125 attached to some suitable part of the lower or horizontal frame of the wheeled carriage. Said side rafters are preferably formed from angle irons to provide upstanding and inturned toes, the latter supporting a floor 126 which occupies the space between the side rafters. From the lower inner edge of the floor project fingers 127, Figs. 7b and 10, which may be integral parts of said floor.

The material sheets or cards 128 are fed from a platform 129, Fig. 1, onto feeding belts 130 each having a portion travelling downward over the floor 126 and around a driving roll 131 at the top of the inclined superstructure of the feed and discharge carriage and an idler roll 132 at the bottom of said superstructure. The means for operating the driving roll 131 will be presently described in connection with the discharge mechanism.

As a material sheet 128 is fed onto the belts 130 it is carried forward until stopped by the trap 133 which is pivoted or swingingly mounted on an arm 134 fixed to a cross rod 135 the latter in turn having its ends fixed in brackets 136 secured to the inclined rafters 124. One end of a connecting rod 137 is pivoted to the trap below its own pivot point and the other end of said connecting rod 137 is pivoted to a crank arm 138 fixed to a rotatable cross shaft 139 journalled in bearings 140 on the lower ends of the side rafters 124. On the cross shaft 139 are also fixed trip fingers 141 that arrest the travel of the sheet 128 after being released by the trap 133. Between the locations of the trap and trip fingers are situated gravity pressure rollers 142 which overlie the feed belts 130 adjacent their lower ends to hold the sheet flat particularly while being shifted sidewise as will be later described and these rollers are mounted in suitable hangers 143 swingingly mounted on the cross rod 135.

The cross shaft 139 is rotated by an intermittent movement mechanism wherefore one end of said shaft projects through a side rafter 124 and has a crank arm 144, Fig. 7c, fixed thereon to which is pivoted one end of a connecting rod 145, the opposite end of said rod being pivoted to the upper part of a latch lever 146 pivoted intermediate its ends to one of the horizontal side pieces, as 113 of the feed and discharge carriage. This latch lever has two flat surfaces 147 and 148 arranged at angles to each other for alternate cooperation with a plunger 149 urged towards the latch lever by a spring 150, both the spring and plunger being located in a housing 151 on the side piece 113.

A connecting hook 151 is pivoted to the upper end of the latch lever 146 and detachably engaged with a pivot 152 on the rocking lever 153 which is pivoted to a bracket 154, or its equivalent, on the machine frame, here shown as one of the rails 117. This arrangement permits disconnection of a part of the feed and discharge mechanism from the balance of the machine to allow the carriage to be wheeled back. The rocker arm 153 is intermittently oscillated from a crank disc or wheel 155 on the shaft 91 through a lost motion rod 156 having one end pivoted to said disc or wheel and the other end being provided with a longitudinal slot 157 registering with the pivot 152 on said rocker arm.

The parts are so timed that when a sheet or card 128 is released by the trip fingers 141 the carrier or chase 38 is in a retracted position and the forward edge of the sheet will contact the spring stops 158 on said carrier. As illustrated in Fig. 4a these spring stops preferably each includes a strip 159 of spring steel fashioned so that one end is fixed to the top face of a portion of the chase or carrier and the other end normally extends upwardly at an angle to the fixed end but can be and is depressed by the pressure member or cylinder 90 when the chase or carrier is moved beneath said cylinder. On the upstanding free end of the spring steel strip is fixed an angle member 160 by one of its toes, the other toe projecting downwardly over the inner edge of the spring strip so as to be opposed to the direction of travel of the sheets and said other toe enters a recess 161 in the chase or carrier when the free end of the strip 159 is depressed.

The chase or carrier 38 has means 162 on its top face to clamp thereto a knife holding block 163 forming a part of the die and on said block are mounted the knives 164, either of the cutting or creasing type or both, depending upon the work to be done, and these knives are arranged in any formation in accordance with the style of the finished product desired. Embracing the knives are strippers 165 of compressible material, such as rubber, so that when the pressure is removed from the material sheet it will be stripped from the knives. The operating edges of the creasing knives are set lower than those of the cutting knives. Compressible lifters 166 of rubber or the like are also provided adjacent the front of the die on which the sheet or card rests while the latter is on the die.

The sheets or cards pass between guides as they travel along the feed line. One of these guides, represented by the numeral 167 is stationary while in use but is adjustable transversely. The guide 167 is carried by an angle supporting member 168 to which are fixed threaded rods 169 projected through a rafter 124 and having nuts 170 screwed thereon. There are at least two nuts on each rod, one nut on each side of the rafter to hold the parts in proper adjustment.

At the opposite side of the feed line is another supporting member 171 provided with threaded rods 172 projecting through the other rafter 124 and on these latter rods are nuts 173 for holding said supporting member 171 in various adjustments. To the supporting member 171 is attached, as at 174, one end of a movable guide 175 which is a relatively long and flexible element. By moving the guide 175 inward it will strike a side edge of the sheet or card 128 which is resting against the spring stops 158 on the carrier or chase and properly register said sheet or card with the die prior to passage beneath the pressure member or cylinder 90.

To cause the movement of the movable guide 175 automatically and at the proper time said guide has a rod 176, Figs. 3 and 10, attached to its lower end which rod carries a pin at its outer end to be engaged by a hook 177 having an end pivoted to the upper end of a vertical lever 178 pivoted intermediate its ends to a bracket 179 on the machine frame. When the hook is disengaged from the rod 176 that portion of the sheet or card registering mechanism on the feed and discharge carriage is released from the operating parts on the machine frame. To the lower end of the lever 178, Figs. 1 and 2, is pivoted one end of a short horizontal rod 180 the opposite end of which is pivoted to one arm of a bell crank lever 181 mounted on a suitable support on the machine frame. To the other arm of said bell crank lever is pivoted one end of a connecting rod 182 having its opposite end pivoted to a crank arm 183 fixed to the outer end of a shaft 184 suitably journalled and extending parallel to the trunnion 34 and terminating in proximity to the gear wheel 33. On the inner end of said shaft 184 is fixed a trip arm 185 in the path of travel of the trip pin 186 on the gear wheel 33. The parts of the sheet or card registering mechanism are urged towards a retracted position by a spring 187 one end of which may be anchored on the machine frame and the other end attached to the connecting rod 182 as the movable element.

After a sheet or card 128 has been cut or creased, as the case may be, and the carrier or chase 38 is on its return to the position illustrated in Fig. 7, the rear edge of said sheet or card is raised by the compressible lifters 166, Fig. 7b, so as to pass under the fingers 127 and over onto the downwardly curved serrated take-off plate 188 fixed to one of the tie bars 114 with the free edge projecting beyond the outer ends of the fingers 127. The lifters 166 are spaced to pass between the serrations, Fig. 4. The sheet or card 128 is pushed along by the spring stops 158 until the weight of said sheet or card causes it to fall onto the discharge belts 189. These belts run on a drive roller 190 and an idle roll 191 journalled in side pieces 112 and 113 of the feed and discharge carriage. When the sheets or cards are carried off by the discharge belts and reach the location of the drive roller 190, said sheets or cards drop into any suitable receiving device 192, Fig. 1.

In order to drive the belts 130 and 189 so the conveying strands travel in opposite directions and to allow one part of the drive to separate from another part when the feed and discharge carriage is retracted, a short axle 193 is fixed in an extension 194 of the machine frame 20 and on said axle is revolvably mounted a gear 195 with which is connected a sprocket 196 or equivalent. A chain 197 or equivalent engages said sprocket 196 and another sprocket 198 fixed to the shaft 27. The parts of the drive thus far described are mounted on the body of the machine as distinguished from the feed and discharge carriage.

Coacting with the gear 195 is a second gear 199 fixed to an axle 200 journalled in a hanger 201 depending from the horizontal side piece 112 of the feed and discharge carriage. Also fixed on said axle 200 is a sprocket 202 or equivalent and other sprockets 203 and 204, or equivalent means, are connected to the drive rollers 131 and 190 respectively. A chain 205, or equivalent, passes around the sprockets 202 and 203 and the back of said chain engages the sprocket 204, thereby revolving the drive rollers 131 and 190 in opposite directions and allowing the chain 205 to be merely withdrawn out of contact with the sprocket 204 when the feed and discharge carriage is retracted towards a position such as illustrated in Fig. 5. With this carriage and the carrier or chase 38 in their fully retracted positions as shown in said Fig. 5 free access can be had to the die receiving portion of said carrier or chase for assembly, adjustment or removal of the die.

For a general outline of the operation of the machine reference will be had in particular to Figs. 2, 5, 7, 8 and 9.

Initially a sheet or card 128 is placed on the feed belts 130 which will carry said sheet forwardly and downwardly until the front edge engages the trap 133 which is closed as in Fig. 7. When the machine parts reach the positions illustrated in Fig. 9 the lost motion rod 156 will actuate the trap 133 and trip fingers 141 to open said trap and close said trip fingers at which time the sheet or card will be released from the trap and allowed to be carried forwardly by the feed belts until said sheet or card engages the trip fingers.

During the next retracting movement of the chase or carrier 38 the sheet or card control mechanism will be again operated to close the trap and open the trip fingers to allow the sheet or card to be again carried forwardly until it engages the spring stops 158 as shown in Figs. 7 and 8. Directly after the sheet or card engages the spring stops the registering mechanism is actuated to cause the movable guide 175 to slide the sheet or card over against the stationary guide 167 so that said sheet or card will be in proper alignment with the die.

Upon retraction of the chase or carrier 38 the striker 45, Figs. 2 and 5, engages the pendulous arm 46 and the lifting mechanism of said chase or carrier will be actuated to cause the wheel cams 67 to take the positions shown in Figs. 5 and 7 so the chase or carrier will be in its lowered position. As the chase or carrier moves inward the sheet or card will be propelled by the feed belts so as to follow the chase or carrier until said sheet or card drops onto the die. At about this time the striker 44 will engage the pendulous arm 46 and swing the latter to the position opposite that shown in Fig. 5 which will actuate the lifting mechanism of the chase or carrier to position the wheel cams 67 as in Fig. 9 thus elevating the chase or carrier to move the card or sheet 128 into engagement with the pressure cylinder 90.

During the return or retracting movement of the chase or carrier the pressure on the card or sheet will be constant and progressive since the pressure cylinder is rotated from said chase or carrier through the racks 87 and the gears 88. This will cause the sheet or card to be cut and/or creased by the die knives. As the compressible lifters 166, Fig. 7b, recede from the influence of the pressure cylinder what was the rear end of the sheet or card will be lifted so as to ride over the take-off plate 188. The continued return movement of the chase or carrier will propel the sheet or card, through the medium of the spring stops 158, until said sheet or card is finally released and drops onto the discharge belts 189 and conveyed to a place of removal.

The operations of the machine may be completely stopped at any time by throwing out the clutch 95 through the proper manipulation of the operating lever 110 but if it is desirable or necessary to run the machine without the functioning of the pressure member or cylinder 90, it is only necessary to actuate the rod 80 by the handle 81 in the proper direction to swing the lifting arm 77 under the connecting rod 74 to disengage it from the pendulous arm 46 while the chase or carrier is lowered. This will allow the machine to operate without functioning to cut and/or crease material sheets or cards if fed into the machine.

It is to be particularly noted that the sheets or cards are never bent around the pressure cylinder and only a small part of the work is accomplished at any one time while in a flat condition, thus producing a better and more uniform product.

In order that there shall be no doubt concerning the method of disconnecting the feed and discharge from the balance of the machine, it is to be observed that when this is necessary or desirable, the hooks 151, Fig. 5, and 177, Fig. 10, are unfastened or separated from their companion elements, allowing the feed and discharge carriage to be wheeled along the rails 117 away from its normal position adjacent the pressure cylinder. As the carriage is wheeled outward the gear 199 merely moves out of mesh with the gear 195 and separation of the feed and discharge mechanism from the main operating mechanism is complete. To reconnect the feed and discharge the operations outlined above are reversed.

Of course we do not wish to be limited to the exact details of construction herein shown and described, as these may be varied with the scope of the appended claims without departing from the spirit of the invention.

Having thus described our invention, what we claim as new and useful is:

1. In a machine of the class described, a flat reciprocating carrier or chase adapted to hold a die, means to elevate said carrier and permit it to descend, a rack at each side of the carrier, a rotary pressure member situated in a fixed location and cooperating with the carrier, a gear at each end of the pressure member meshing with the respective racks, mechanism to impart a reciprocating movement to the carrier, and manually operable means to temporarily stop the action of the carrier elevating means.

2. A cutting and creasing machine including a carrier for reciprocation in a horizontal line, a pressure member situated in a fixed location and rotatable by the reciprocal movements of the carrier, and means to elevate said carrier while at one end of its stroke and permit said carrier to descend when at the other end of its stroke.

3. The structure in claim 2, in combination with a feed trap, trip fingers, means to simultaneously actuate said trap and fingers to alternately open and close them, guide means, and mechanism to move one portion of said guide means towards the other portion thereof.

4. A machine of the kind described comprising a frame, cam shafts journalled in said frame, wheel cams on said cam shafts, a carrier adapted to hold a die and mounted on the wheel cams for reciprocating movements, means to reciprocate said carrier, mechanism connected with the carrier and cam shafts to transmit an intermittent motion to said cam shafts for elevating the carrier and allowing it to descend at the ends of the in and out strokes respectively of said carrier, and a pressure cylinder cooperating with and rotated by said carrier.

5. A cutting and creasing machine comprising, in combination, a frame, eccentric cam shafts having off-set portions and journalled in said frame, wheels on the off-set portions of said cam shafts, a carrier mounted to ride on said wheels and be elevated thereby and allowed to descend as the cam shafts are rotated, means to reciprocate the carrier, means actuated by the motions of said carrier to rotate the cam shafts, a curved pressure member situated in a fixed location for cooperation with the carrier, and coacting means on the carrier and pressure member for transmitting a rotary motion from said carrier to said pressure member.

6. In a machine of the kind described, a frame, eccentric cam shafts journalled in said frame and provided with off-set portions, arms on said cam shafts, means connected with said arms whereby the cam shafts may be rotated in unison, a pendulous pivoted arm, a connecting rod pivoted to one of the cam shaft arms and detachably joined to the pendulous arm, wheels journalled on the eccentric portions of the cam shaft, a die carrier riding on said wheels and elevated and allowed to descend by the rotary action of the cam shafts, means to reciprocate said die carrier, a striker rod attached to the carrier and associated with the pendulous arm, strikers on said striker rod to alternately swing the pendulous arm in opposite directions for intermittently rotating the cam shafts, manually operated means for temporarily detaching the connecting rod from the pendulous arm to selectively stop the elevation or descent of the carrier, and a rotary pressure cylinder cooperating with said carrier.

7. In a machine of the kind described, a frame, a die carrier, a prime mover on the frame, a pulley driven by said prime mover, a counter shaft journalled in the frame, two pulleys thereon, a belt engaging one of said pulleys and the one driven by the prime mover, a power shaft journalled in the frame, a loose pulley thereon, a belt engaging the power shaft pulley and the other one on the counter shaft, a spring urged clutch member slidably and non-rotatably mounted on the power shaft for cooperation with the pulley on said power shaft, a flange as a part of the clutch member, a rotatable cam shaft having a cam coacting with the clutch flange, a gear on said cam shaft, a rack meshing with the gear, a slide having an oblique slot registering with a projection on the rack to move said rack longitudinally at right angles to the direction of movement of the slide, means to operate said slide, a pinion fixed to the power shaft, a gear journalled on a trunnion supported by the frame and meshing with the pinion, a pitman connected to the gear and the carrier for reciprocating the latter, a pressure cylinder situated in a fixed location on the frame for cooperation with the carrier, and mechanism actuated from the carrier to raise said carrier towards the pressure cylinder and allow said carrier to descend.

8. The structure in claim 7, in combination with an independent feed and discharge mechanism including a wheeled carriage mounted for to and fro movements relative to the pressure cylinder, and means to operatively connect said feed and discharge mechanism with the driving parts of the machine.

9. In a cutting and creasing machine, a frame, a carrier, mechanism to reciprocate said carrier and including a gear and a counter shaft, a sprocket on said counter shaft, an axle journalled in the frame, a sprocket on said axle, a chain engaging said sprockets whereby motion is transmitted from the counter shaft to said axle, a gear fixed to said axle, a pressure cylinder for cooperation with the carrier and rotated therefrom, a shaft on which the pressure cylinder is mounted, a crank element fixed to and rotatable with said pressure cylinder shaft, a rocker arm having a pivot at its free end, a slotted rod pivoted to the crank element with its slot registering with pivot on the free end of the rocker arm, a wheeled carriage mounted on rails secured to the frame and including horizontal side pieces and inclined rafters, rolls journalled in the top and bottom ends of said rafters, feed belts passing around said rolls, other rolls journalled in the inner and outer ends of the side pieces, discharge belts passing around the last named rolls, sprockets associated with the upper and outer rolls, an axle journalled in one of the side pieces of the carriage, a gear fixed to said last named axle and meshing with the gear on the first mentioned axle only when the carriage is positioned adjacent the pressure cylinder, a sprocket on the last named axle, a chain passing about the last mentioned sprocket and the sprocket associated with the upper roll and the back of said chain engaging the sprocket associated with the other roll, a rotatable cross shaft between the lower ends of the rafters, trip fingers on said cross shaft in the path of travel of the feed belts, a trap also in the path of travel of the feed belts and spaced from and ahead of the trip fingers, means connected with the trap and cross shaft whereby the trip fingers and trap will be actuated in unison to close one when the other is opened, a crank on said cross shaft, a latch lever to be temporarily held at the end of each swing, means to connect the crank and latch lever, and means detachably connecting the latch lever and rocking lever.

10. The structure in claim 9, in combination with a trip pin on the gear of the carrier reciprocating means, a stationary guide adjustably connected to one of the inclined rafters, a movable guide connected to the other rafter, a two section separable push rod attached to said movable guide, and mechanism having a part joined to said push rod and another part in the path of travel of the trip pin for intermittently operating the movable guide.

11. The structure in claim 9, in combination with guide fingers projecting at a downward angle beyond the feed belts, and a serrated take-off plate mounted adjacent the inner portion of the discharge belts, the outer free end of said take-off plate extending beyond the outer free ends of the guide fingers.

12. The structure in claim 9 in combination with spring stops mounted on the carrier crosswise thereof and depressible by the pressure cylinder into recesses in said carrier.

13. A cutting and creasing machine comprising a horizontally reciprocating carrier, a die mounted on said carrier, a rotary pressure member situated in a stationary location, coacting means on the carrier and pressure member for imparting a rotary motion to said pressure member from said carrier, and means to elevate the carrier when at one end of its stroke and permit said carrier to descend when at the other end of its stroke.

CARL SCHWARZ.
OTTO BAUER.